(12) United States Patent
Bliss et al.

(10) Patent No.: US 7,864,464 B2
(45) Date of Patent: *Jan. 4, 2011

(54) DISK CLOCK SYSTEM WITH UP-SAMPLER TO GENERATE FREQUENCY OFFSET

(75) Inventors: William Gene Bliss, Thornton, CO (US); Thomas V. Souvignier, Longmont, CO (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/648,746

(22) Filed: Dec. 29, 2009

(65) Prior Publication Data

US 2010/0091398 A1    Apr. 15, 2010

Related U.S. Application Data

(63) Continuation of application No. 12/110,321, filed on Apr. 27, 2008, now Pat. No. 7,643,233.

(60) Provisional application No. 61/066,149, filed on Apr. 30, 2007.

(51) Int. Cl.
*G11B 5/02* (2006.01)

(52) U.S. Cl. .............................. 360/25; 360/29; 360/32; 360/65

(58) Field of Classification Search ........................ None
See application file for complete search history.

(56) References Cited

U.S. PATENT DOCUMENTS

| | | | | |
|---|---|---|---|---|
| 6,111,710 A * | 8/2000 | Feyh et al. | .................... | 360/46 |
| 6,519,103 B2 * | 2/2003 | Cyrusian | ..................... | 360/46 |
| 6,738,205 B1 * | 5/2004 | Moran et al. | .................. | 360/17 |
| 6,768,956 B2 * | 7/2004 | Hayashi | ....................... | 702/91 |
| 6,810,485 B2 * | 10/2004 | McEwen et al. | ............ | 713/503 |
| 7,199,956 B1 * | 4/2007 | Moser et al. | .................. | 360/46 |
| 7,248,549 B2 * | 7/2007 | Rauschmayer | ........... | 369/47.28 |
| 7,298,570 B1 * | 11/2007 | Han | ............................. | 360/65 |
| 7,508,611 B2 * | 3/2009 | Buch et al. | .................... | 360/51 |
| 7,675,702 B2 * | 3/2010 | Watt et al. | ..................... | 360/51 |
| 2007/0165319 A1 * | 7/2007 | Fisher | ......................... | 360/51 |
| 2007/0195445 A1 * | 8/2007 | Vanlaanen et al. | ............ | 360/51 |

\* cited by examiner

*Primary Examiner*—Dismery E Mercedes
(74) *Attorney, Agent, or Firm*—Garlick Harrison & Markison; Shayne X. Short; Robert A. McLauchlan, III

(57) ABSTRACT

A system reads data from a magnetic storage media. A read head reads data from the magnetic storage media and produce an analog signal. A variable gain amplifier amplifies the analog signal. An offset adjust module substantially centers the amplified analog signal to a midscale. A Magneto Resistive Asymmetry (MRA) correction module MRA corrects the amplified analog signal. A Continuous Time Filter (CTF) compensation module processes the amplified analog signal. An Analog to Digital Converter (ADC) samples the amplified analog signal based upon a control signal to produce a digital signal. A Disk Lock Clock (DLC) system produces the control signal to the ADC. The control signal is representative of a frequency offset caused by at least one servo wedge rate error. A Finite Impulse Response (FIR) filter module filters the digital signal. A sequence detector processes the digital signal and detects a bit sequence from the digital signal.

20 Claims, 8 Drawing Sheets

DISK CLOCK SYSTEM WITH UP-SAMPLER TO GENERATE FREQUENCY OFFSET

CROSS REFERENCE TO RELATED PATENTS/PATENT APPLICATIONS

Continuation Priority Claim, 35 U.S.C. §120

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 12/110,321, entitled "Disk clock system with up-sampler to generate frequency offset,", filed Apr. 27, 2008, pending, and scheduled to be issued as U.S. Pat. No. 7,643,233 on Jan. 5, 2010, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 61/066,149, entitled "Disk clock system with up-sampler to generate frequency offset at high rate than servo wedge rate,", filed Apr. 30, 2007, now expired.

BACKGROUND OF THE INVENTION

1. Technical Field of the Invention

Embodiments of the present invention relate generally to memory storage devices; and, more particularly, embodiments of the present invention relate signal processing within a magnetic read channel.

2. Description of Related Art

As is known, many varieties of memory storage devices (e.g. disk drives), such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

The structure and operation of hard disk drives is generally known. Hard disk drives include, generally, a case, a hard disk having magnetically alterable properties, and a read/write mechanism including Read/Write (RW) heads operable to write data to the hard disk by locally altering the magnetic properties of the hard disk and to read data from the hard disk by reading local magnetic properties of the hard disk. The hard disk may include multiple platters, each platter being a planar disk.

All information stored on the hard disk is recorded in tracks, which are concentric circles organized on the surface of the platters. Data stored on the disks may be accessed by moving RW heads radially as driven by a head actuator to the radial location of the track containing the data. The track-based organization of data on the hard disk(s) allows for easy access to any part of the disk, which is why hard disk drives are called "random access" storage devices.

Since each track typically holds many thousands of bytes of data, the tracks are further divided into smaller units called sectors. This reduces the amount of space wasted by small files. Each sector holds 512 bytes of user data, plus as many as a few dozen additional bytes used for internal drive control and for error detection and correction.

With increases in data density stored to the hard disk, the effects of non-circular periodic errors are increased. Further limitations and disadvantages of conventional and traditional read channel signal processes and related functionality will become apparent to one of ordinary skill in the art through comparison with the present invention described herein.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGURES, like numerals being used to refer to like and corresponding parts of the various drawings. Advantages and features of embodiments of the present invention may become apparent from the description, accompanying drawings and claims.

Embodiments of the present invention provide a read-channel Integrated Circuit (IC) for use within a Hard Disk Drive (HDD). A system constructed according to embodiments of the present invention reads data from magnetic storage media and includes an analog front end (AFE) coupled to a sequence detector operable to produce a bit sequence read from the magnetic media. Reading information from the magnetic storage media includes passing a read head over the magnetic storage media to produce an analog signal. The analog signal may then be amplified such that the range of the amplified analog signal falls within a range of an Analog to Digital Converter (ADC) used to sample the then amplified analog signal. Next a baseline adjustment is performed on the amplified analog signal to remove DC content/center the amplified analog signal to a midscale of the ADC. The amplified analog signal may be sampled (or oversampled) using a Disk Lock Clock (DLC) system to detect periodic frequency offset errors (servo wedge rate errors) caused by disk servo wedge inconsistencies (or other inconsistencies). The ADC may be directed by the DLC system to compensate for the periodic frequency offset errors by generating a Frequency Offset using a Repeatable Frequency Error Predictor. The resulting digital signal may be filtered and a bit sequence may then be detected from the filtered digital signal. The bit sequence is further processed to extract information, the extracted information being that which was previously stored on the magnetic storage media.

Figure 1:
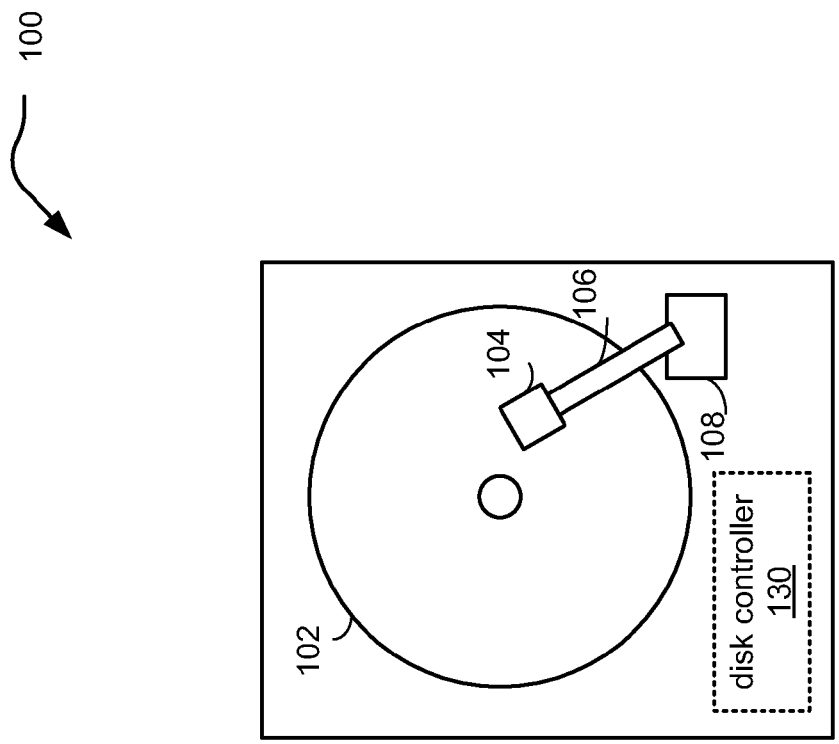
FIG. 1 is a schematic diagram illustrating a disk drive unit in accordance with an embodiment of the present invention.

FIG. 1 is a schematic diagram illustrating a disk drive unit in accordance with an embodiment of the present invention. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, or 15,000 RPM, for example. In some embodiments, disk 102 is a magnetic disk that stores information as magnetic field variations. The disk 102 may be rigid or non-rigid, may be removable or non-removable, and may be coated with magnetic material to provide its magnetic qualities.

Disk drive unit 100 further includes one or more read/write (RW) heads 104 that are coupled to arm 106 that is moved by actuator 108 over the surface of the magnetic disk 102 either by translation, rotation, or both. The head assembly may also be referred to as a head gimbal assembly (HGA) that positions a RW head, which in some embodiments may be a thin-film magnetic head, to record and read magnetic information into and from a recording surface of a hard disk or recording medium rotating at high speed. Pre-amplifier (within the RW head or located between the RW head and the disk controller) may be used to condition the signals written to and read from the RW head. Disk controller 130 controls read and write operations, controls the speed of the servo motor and the motion of actuator 108, and provides an interface to and from a host device.

Figure 2:
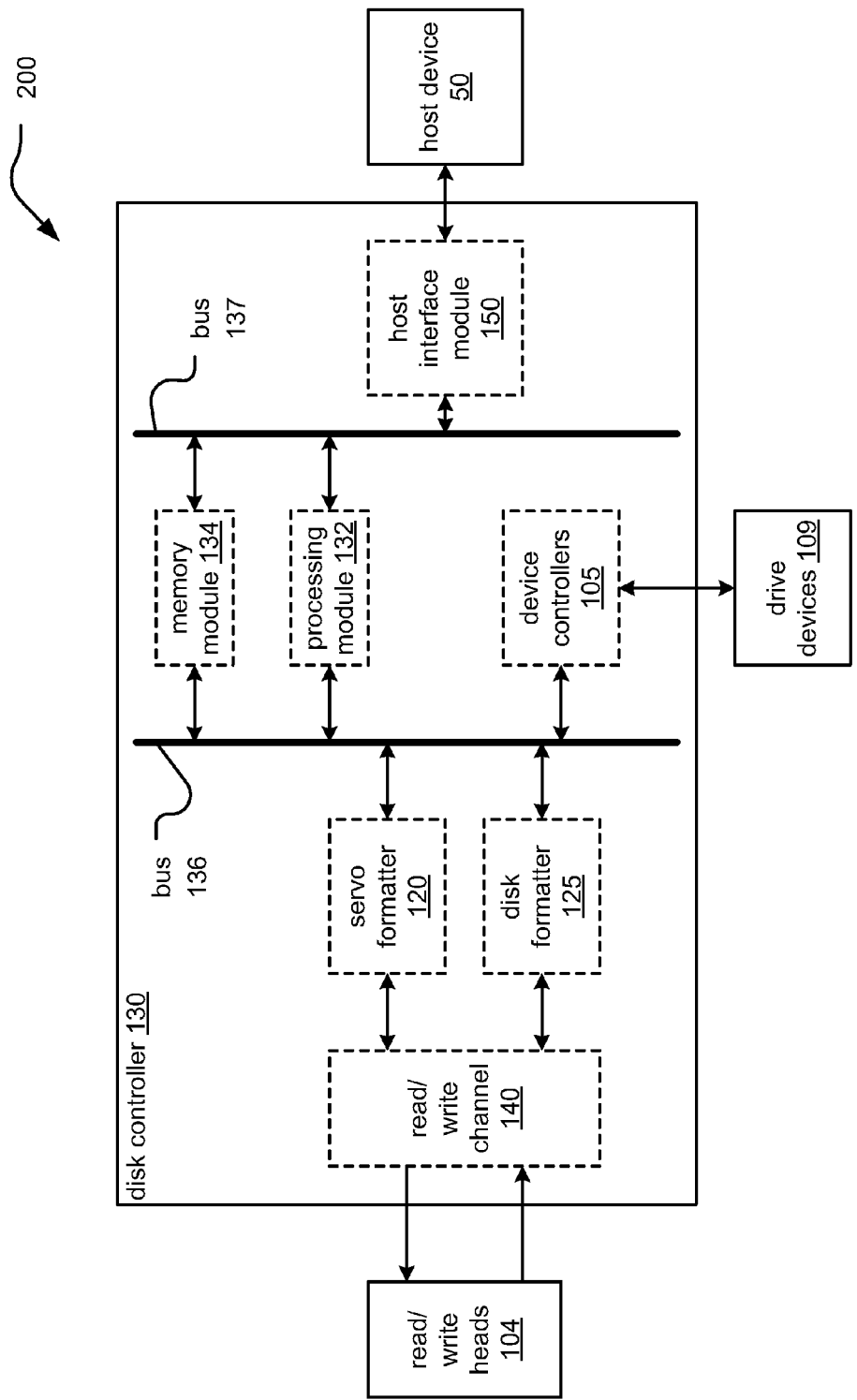
FIG. 2 is a block diagram illustrating a system that includes a disk controller in accordance with an embodiment of the present invention.

FIG. 2 is a block diagram illustrating a system 200 than includes a disk controller 130 in accordance with an embodiment of the present invention. In particular, disk controller 130 includes a read/write channel 140 for reading and writing data to and from magnetic disk 102 through read/write heads 104. Disk formatter 125 controls the formatting of data and provides clock signals and other timing signals that control the flow of the data written to, and data read from magnetic disk 102. Servo formatter 120 provides clock signals and other timing signals based on servo control data read from magnetic disk 102. Device controllers 105 control the operation of drive devices 109 such as actuator 108 and the servo motor, etc. Host interface module 150 receives read and write commands from host device 50 and transmits data read from magnetic disk 102 along with other control information in accordance with a host interface protocol. In one embodiment, the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 may be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes, or functions in order to provide fault tolerance or redundancy. Alternatively, the function, steps, and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing module 132, memory module 134, read/write channel 140, disk formatter 125, and servo formatter 120 that are interconnected via bus 136 and bus 137. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in various embodiments.

In one possible embodiment, one or more modules of disk controller 130 are implemented as part of a system on a chip (SoC) integrated circuit. In an embodiment, this SoC integrated circuit includes a digital portion that can include additional modules such as protocol converters, linear block code encoding and decoding modules, etc., and an analog portion that includes device controllers 105 and optionally additional modules, such as a power supply, etc. In a further embodiment, the various functions and features of disk controller 130 are implemented in a plurality of integrated circuit devices that communicate and combine to perform the functionality of disk controller 130.

Referring to both FIG. 1 and FIG. 2, when the disk drive unit 100 is manufactured, the disk formatter 125 writes a plurality of servo wedges along with a corresponding plurality of servo wedge address marks at equal radial distance upon the magnetic disk 102. The servo wedge address marks are used by the disk drive controller for triggering a "start time" for various events employed when accessing the magnetic disk 102 using the read/write heads 104. When the servo wedges are uniformly distributed across the magnetic disk 102, access of the magnetic disk 102 is predictable. However, if the center of rotation of the magnetic disk 102 is altered to create a "centering error", by dropping the disk drive unit 100 for example, the relative angular position of adjacent servo wedges is non-uniform. Further, if the plurality of servo wedges is externally written upon the magnetic disk drive 102 prior to assembly of the disk drive unit 100, the relative angular position of adjacent servo wedges may also be non-uniform due to cause a "centering error" upon assembly. This type of problem may be more likely in a drive having a removable magnetic disk 102.

Figure 4:
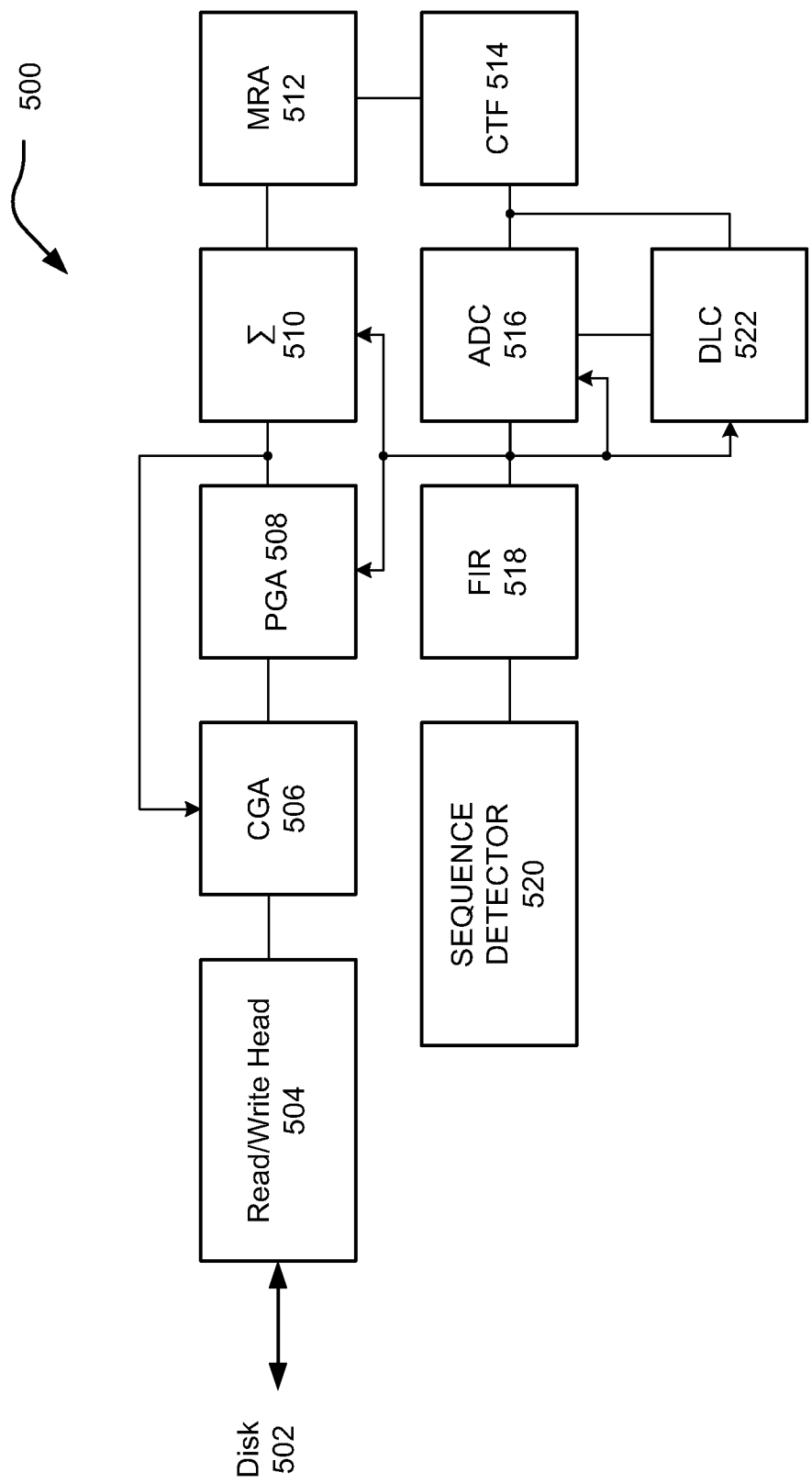
FIG. 4 is a block diagram illustrating components of a read channel used to read data from a magnetic storage media such as a disk within a Hard Disk Drive (HDD) in accordance with one or more embodiments of the present invention.
Figure 5:
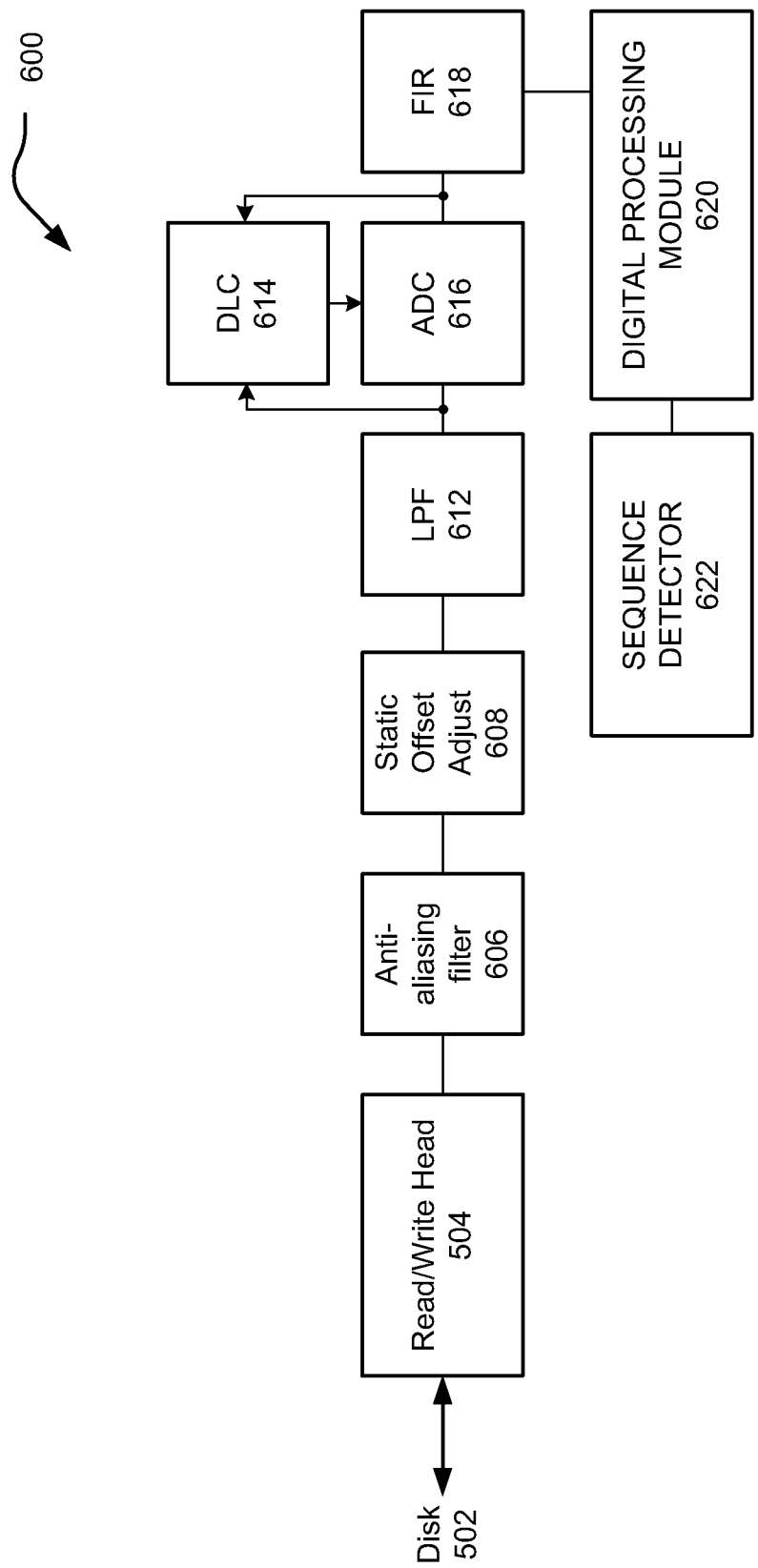
FIG. 5 is a block diagram illustrating another read channel structure constructed and operating in accordance with one or more embodiments of the present invention.
Figure 6:
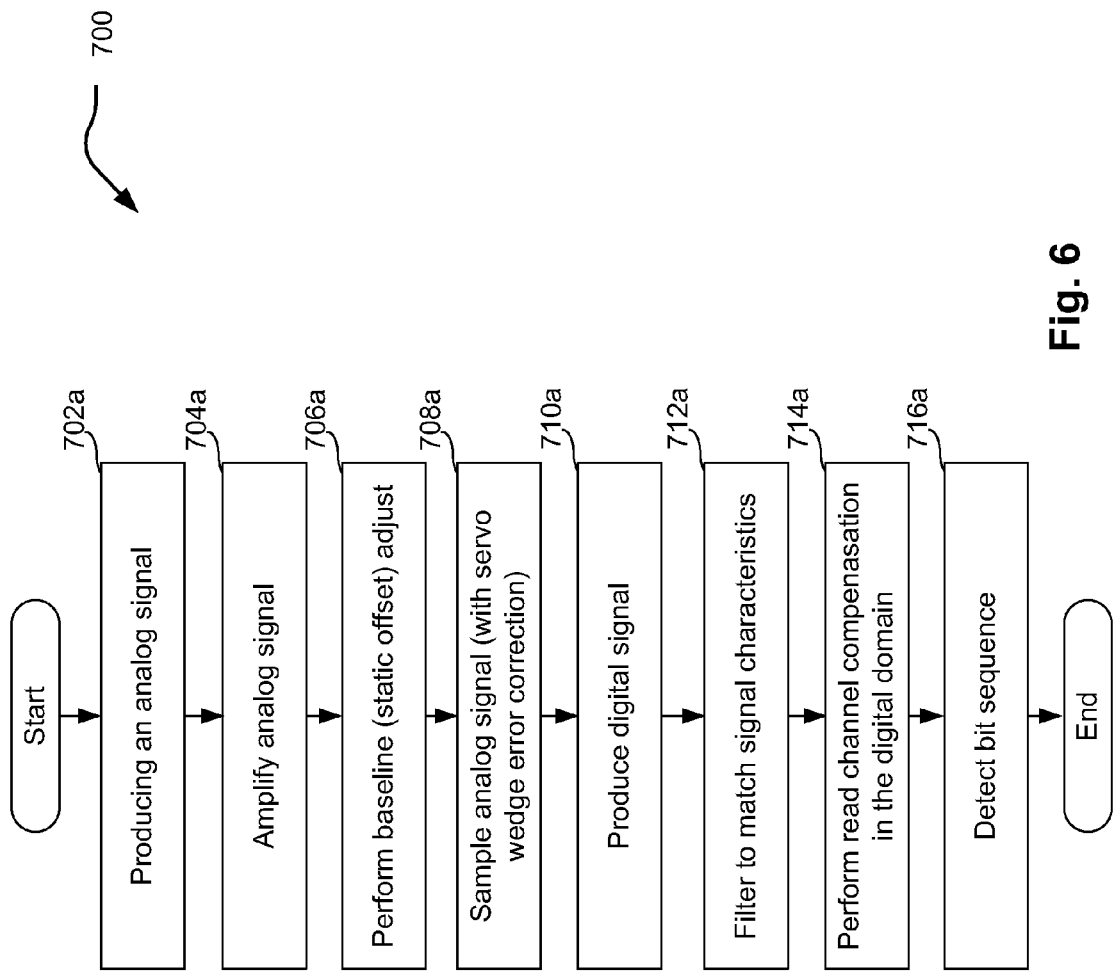
FIG. 6 is a flow chart illustrating operations of a read channel of a HDD that performs operations in accordance with one or more embodiments of the present invention.

As will be further described herein with reference to FIGS. 4-6, the read/write channel 140 of the disk drive controller 140 includes a plurality of electronic components that process signals during both read and write operations and also control the read/write heads 104. During read operations, read channel circuitry processes signals received from the read/write heads 104. Variations in positions of the servo wedges caused by a "centering error" creates a "once around" frequency error in read path operations. The "centering error" may also/alternately be evident in frequency errors while accessing data from adjacent servo wedges. While these frequency errors may be entirely predictable, they are observed as a large step frequency transient in the read channel signal that cannot be conveniently handled by conventional read channel circuitry.

Thus, according to embodiments of the present invention, the disk drive controller 130 includes the Disk Lock Clock (DLC) system that generates frequency offset(s) that compensate for frequency offsets caused by the "centering error". The DLC system adapts to the predictable frequency step error(s) when reading information from adjacent servo wedges of a disk having a "centering error". The DLC system, by compensating for the predictable frequency step error caused by the "centering error" of the magnetic disk 102, compensates for errors that would otherwise be introduced into/by components of the read channel circuitry that are data driven, e.g., a Phase Locked Loop (PLL) that operates in a Data Mode timing recovery mode.

One particular embodiment of the DLC system includes a hardware (or firmware) algorithm that predicts (generates) the "once around" error by sampling/up-sampling the servo wedge error at/to a much higher sampling frequency e.g., sampling at approximately 1 MHz as compared to the servo wedge rate of 10 KHz. By sampling input signal at a much higher sampling rate, the servo wedge error between adjacent servo wedges may be relatively easily tracked and resultantly used to produce frequency offset(s) used to compensate for the "centering error". Such is the case because the frequency variation of the servo wedge error caused by the "centering error" now falls within the bandwidth of the sampled signal at the higher sampling frequency. Once the periodic frequency error caused by the "centering error" is determined, a prediction of the frequency error may be used to adjust sampling of an ADC in the read path, effectively removing the frequency offset error.

Figure 3:
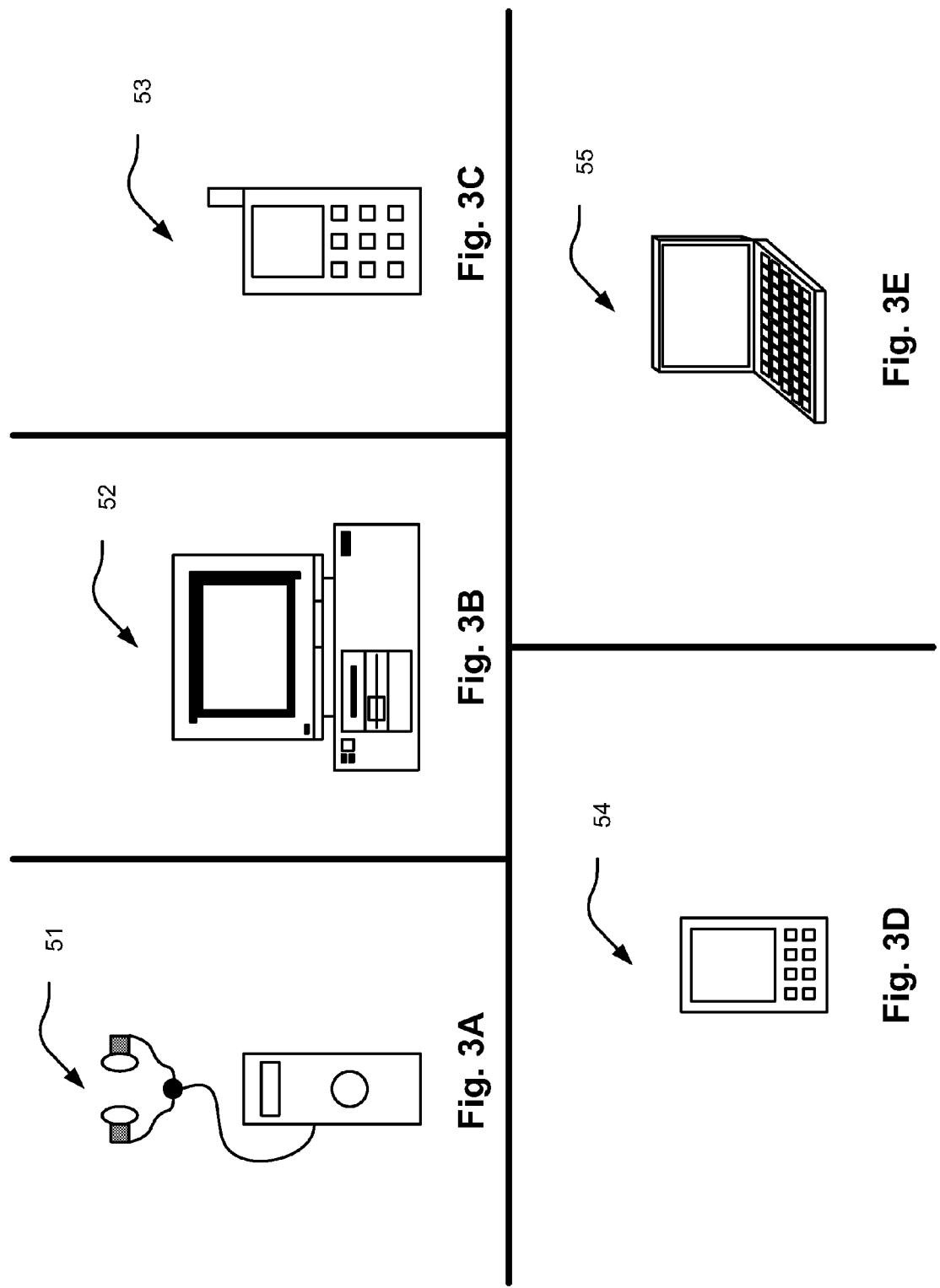
FIGS. 3A through 3E depict various devices that employ disk drive units in accordance with an embodiment of the present invention.

FIGS. 3A through 3E depict various devices that employ disk drive units in accordance with an embodiment of the present invention. FIG. 3A illustrates an embodiment of a handheld audio unit 51. In particular, a disk drive unit 100 can be contained within and used by the handheld audio unit 51. In one possible embodiment, the disk drive unit 100 can include a small form factor magnetic hard disk whose magnetic disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

FIG. 3B illustrates an embodiment of a computer 52. In particular, disk drive unit 100 can be implemented in the computer 52. In one possible embodiment, disk drive unit 100 can include a small form factor magnetic hard disk whose magnetic disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

FIG. 3C illustrates an embodiment of a wireless communication device 53. In particular, disk drive unit 100 can be implemented in the wireless communication device 53. In one possible embodiment, disk drive unit 100 can include a small form factor magnetic hard disk whose magnetic disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In a possible embodiment, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

FIG. 3D illustrates an embodiment of a personal digital assistant (PDA) 54. In particular, disk drive unit 100 can be implemented in the personal digital assistant (PDA) 54. In one possible embodiment, disk drive unit 100 can include a small form factor magnetic hard disk whose magnetic disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

FIG. 3E illustrates an embodiment of a laptop computer 55. In particular, disk drive unit 100 can be implemented in the laptop computer 55. In one possible embodiment, disk drive unit 100 can include a small form factor magnetic hard disk whose magnetic disk 102 has a diameter 1.8" or smaller, or a 2.5" drive. Disk drive 100 is incorporated into or otherwise used by laptop computer 52 to provide general purpose storage for any type of information in digital format.

FIG. 4 is a block diagram illustrating components of a read channel used to read data from a magnetic storage media such as a disk within a Hard Disk Drive (HDD) in accordance with one or more embodiments of the present invention. The read channel can be a single chip or integrated as part of a storage system-on-a-chip (SoC). For this discussion, the channel refers to the core that is used in either application. A channel's chief function is to convert the analog signal presented at the input back into the digital data that has been stored on the disk.

Read channel 500 interfaces with a disk 502 that stores data and includes a read write head 504, a constant gain amplifier (CGA) 506, a programmable gain amplifier (PGA) 508, a summing module 510, a magnetic resistive asymmetry (MRA) correction module 512, a continuous time filter (CTF) 514, an analog to digital converter (ADC) 516, a Disk Lock Clock (DLC) system 522, a finite impulse response (FIR) filter 518, and a sequence detector 520.

"Reading" a signal in a hard disk drive begins at the media (the drive's storage platter 502) and read write head 504. Read write head 504 includes a head transducer. The head transducer is located prior to a preamp in the data path of the read/write head 504. The head transducer output is driven from a magnetic data pattern previously written on the rotating disk 502. The read sensor senses the magnetization in the recording layer of the disk and produces an analog signal as the disk 502 rotates below the read sensor.

Following the head transducer, a signal travels to a HDD preamplifier IC, which provides gain for the signal output as well as biasing for the head's magnetic sensor. The bias allows better reproduction of the signal's magnetic transitions. The signal, therefore, is amplified by the preamp to maximize the read-channel's capabilities once it arrives at the channel. In addition, the output of the preamplifier is differential to allow any noise pick-up to be common mode on both preamplifier differential signal lines between the preamplifier located on suspension out by the head—and the read-channel on the drive card. The preamp differential signals travel down the suspension on flex circuit traces to a pressure connection, which transitions the signal to the drive card trace.

The first stage of the analog front end (AFE) of the read channel core consists of a stage to remove DC offset in the signal. This is accomplished through AC coupling and DC baseline correction. The variable gain amplifier (VGA) shown as two separate components, a constant gain amplifier 506 and a programmable gain amplifier 508 provides gain determined by the automatic gain control loop. The main function of the VGA is to control signal level for optimum performance in the ADC 516. Too much gain can cause the ADC sample values to rail at maximum or minimum ADC levels; too little gain can cause quantization noise to dominate SNR and adversely affect bit error rate performance.

Summing Junction ($\Sigma$) 510 adds in any additional DC correction necessary beyond the DC attenuation provided in the AC coupling. The goal of the DC correction is to keep the signal centered on the baseline which will become mid scale for the ADC converter so that the sequence detector 520 trellis decoders will work optimally to determine the sequence bits from the samples presented, i.e., to keep signal offsets from driving the signal amplitude into saturation.

Magneto resistive asymmetry (MRA) correction module 512 and the continuous time filter (CTF) module 514 operate in the analog domain to linearize the signal prior to the ADC 516. MRA correction works to reconstruct linearity that may have been lost in the head transducer stage during the conversion of the magnetic signal on the disk to an electrical signal at the output of the head. Biasing of the head signal of the read/write head 504 is adjusted to keep the signal in the linear range of the read/write head sensitivity curve. However, if the magnetic signal amplitude variations caused by fly height or disk magnetic variation exceeds the head transducer linear range, saturation in the peak or trough of the electrical head signal can occur. The MRA correction considers signal offset to determine an amount of non-linear compensation (squared signal) to apply to the analog signal to restore the positive and negative symmetry of the signal.

The CTF module 514, applied after the MRA correction, provides mid-band peaking to help with achieving a target signal response and to keep the signal energy below a predetermined Nyquist rate to minimize any aliases that may occur when the analog signal is converted to a sampled representation. While aliases may not have a large effect on a drive surface's bit error rate performance, they can cause an impact to HDD manufacturing yields.

The ADC block 516 converts an analog signal to digital samples quantized in time and amplitude. The clock used is the output of DLC system 522, which tracks the channel rate clock frequency. Prior DLC systems were severely limited when the magnitude of the desired frequency step between two adjacent servo wedges is large. This limitation resulted when a large step in frequency (caused by "centering error") resulted in transients in PLLs that operate in a Data Mode timing recovery mode can not handle well. The DLC system 522 implements an algorithm that predicts (generates) this once around error (periodic frequency offset error) and that produces a sampling clock to the ADC 516 that compensates for this/these errors. The DLC operates at a much higher sampling frequency. (i.e., upsampling from 10 KHz servo wedge rate to approx 1 MHz in one embodiment may be sufficient to reduce the magnitude of the step sufficiently.) The DLC system may be implemented in hardware (or firmware). The DLC system may produce updated sampling prediction as often as at each servo wedge time. A digital Phase Locked Loop (PLL) upon which the ADC 516 samples its incoming analog signal may be present in the ADC 516 or the DLC 522. The output of the ADC is used as feedback to control the timing of the digital PLL as well as the automatic gain control with PGA 508, DC baseline correction in Summing Junction ($\Sigma$) 510, and FIR adaptation in FIR filter module 518.

The finite impulse response (FIR) filter module 518 performs filtering to match signal characteristic to an ideal target response for bit detection. As with all sections of the analog front end, the performance of this filter is important to achieve the desired architectural target response.

At the output of the FIR 518, the signal is in a fully digital form ready for detection by sequence detector 520. Regardless of whether the data was recorded using perpendicular or horizontal techniques, the read channel functions are similar. The sample stream is submitted to the sequence detector 520 to begin decoding using a trellis decoder, for example. Once bit recovery is completed, parity post processing can then be performed, followed by decoding the run length limited codes and de-scrambling the resulting sequence. These steps ultimately reveal the original user data.

FIG. 5 is a block diagram illustrating another read channel structure constructed and operating in accordance with one or more embodiments of the present invention. The read channel 600 of FIG. 5 includes read write head 504 that reads disk 502, anti-aliasing filter 606, static offset adjust 608, low pass filter 602, ADC 610, a DLC system 614, a FIR 618, a digital processing module 620, and a sequence detector 622. Read write head 504 reads an analog signal from disk 502. A read sensor of the read/write head 504 senses magnetization in a recording layer of the disk 502 and produces an analog signal as the disk media rotates below the read's head.

Anti-aliasing filter 606 may include a programmable gain amplifier amplifies the analog signal provided by read write head 504 to produce a signal that will allow the dynamic range of ADC 616 to be fully utilized. The anti-aliasing filter 606 further filters the analog signal in an effort to remove alias signals that may have been introduced in the sampling process. Static offset adjust module 608 provides additional DC correction necessary beyond that provided in the AC coupling performed within read write head 504. The goal of the DC correction provided by the static offset adjust module 608 is to keep the analog signal centered on a baseline which is mid scale for ADC converter 616 in order to allow optimal operation of the digital architecture. The baseline or DC correction does not provide high speed real time adjustments to an analog offset based on a detected or estimated transmitted signal, but rather adjustments are made to compensate for slow drifting of the analog offset due to temperature and voltage. A low pass filter (LPF) 612 operates on the DC corrected signal to provide an input to ADC 616.

The ADC 616 samples the signal to produce a digital signal. ADC 616 samples at a sampling rate to satisfy the Nyquist criteria for the incoming analog signal. The DLC system 614 provides a control signal to ADC 616. This control signal may be either a sampling signal or a frequency error offset correction signal that the ADC 616 uses to adjust its sampling time to compensate for periodic frequency offset errors caused by "centering error", for example. Thus, in one embodiment, ADC 616 is directed by a DLC system 614 to sample the signal on the disk as the read write head passes over the signal, considering frequency offset caused by "centering error." This allows for any errors associated with a non-circular non-constant RPM, non-stable disk to be corrected for at the ADC 614. Alternately, the ADC 616 produces its own sampling signal based upon a frequency offset signal or correction signal received from DLC 614.

Thus, with its correct sampling position, ADC 616 provides an optimally sampled digital signal to FIR filter 618. FIR 618 provides a digital signal to digital processing module 620, wherein digital processing module 620 performs read channel compensation in the digital domain. This read channel compensation may involve correcting errors in the baseline or DC level of the signal due to missing low frequency energy caused by high pass filter(s) in the preamp and/or the analog portion of the read channel, correcting or compensating for distortions caused by MRA or related head types asymmetry, correcting for misequalization or mismatch in magnitude and/or phase between the digitized signal and a desired target for a sequence detector, CTF filtering or other read channel compensation known to those having skill of the art. Following read channel compensation, sequence detector 622 detects a bit sequence from the compensated digital signal.

FIG. 6 is a flow chart illustrating operations of a read channel of a HDD that performs operations in accordance with one or more embodiments of the present invention. The storage media may be a disk within a hard disk drive or other magnetic disk drive known to those having skilled in the art. Operation 700 begins by passing a read head over a magnetic storage media to produce an analog signal in step 702a. This analog signal may be amplified in step 704a such that a range of the amplified analog signal substantially matches a range of an ADC to be used within this read path. A baseline adjust or static offset may then be performed in step 706a on the amplified analog signal to then center the amplified analog signal to the scale of ADC. The baseline or DC correction does not provide high speed real time adjustments to an analog offset based on a detected or estimated transmitted signal, but rather adjustments are made to compensate for slow drifting of the analog offset due to temperature and voltage. Steps 702a and 704a allow embodiments of the present invention to take full advantage of the capabilities of the ADC.

In step 708a the amplified analog signal will be sampled. A DLC system provided by embodiments of the present invention provides an algorithm that predicts periodic offset errors and either: (1) provides a sampling signal to the ADC with sampling frequency offset introduced therein; or (2) provides a sampling frequency offset to the ADC that the ADC uses to adjust its sampling point. The DLC system may be implemented in hardware (or firmware). The DLC system would be used to update a sampling offset position (and could update it as often as at each wedge time). At step 710a a digital signal is produced from the amplified analog signal. This may be filtered in step 712a to match signal characteristics for bit detection. Read channel compensation may then be performed in the digital domain in step 714a to produce a compensated digital signal from that produced by the ADC and FIR filter. This process may also be performed by the digital processing module. This read channel compensation may involve correcting errors in the baseline or DC level of the signal due to missing low frequency energy caused by high pass filter(s) in the preamp and/or the analog portion of the read channel, correcting or compensating for distortions caused by MRA or related head types asymmetry, correcting for misequalization or mismatch in magnitude and/or phase between the digitized signal and a desired target for a sequence detector, CTF filtering or other read channel compensation known to those having skill of the art. Following read channel compensation, a sequence detector such as one using a Viterbi algorithm to detect a bit sequence from the compensated digital signal in step 716a.

Figure 7:
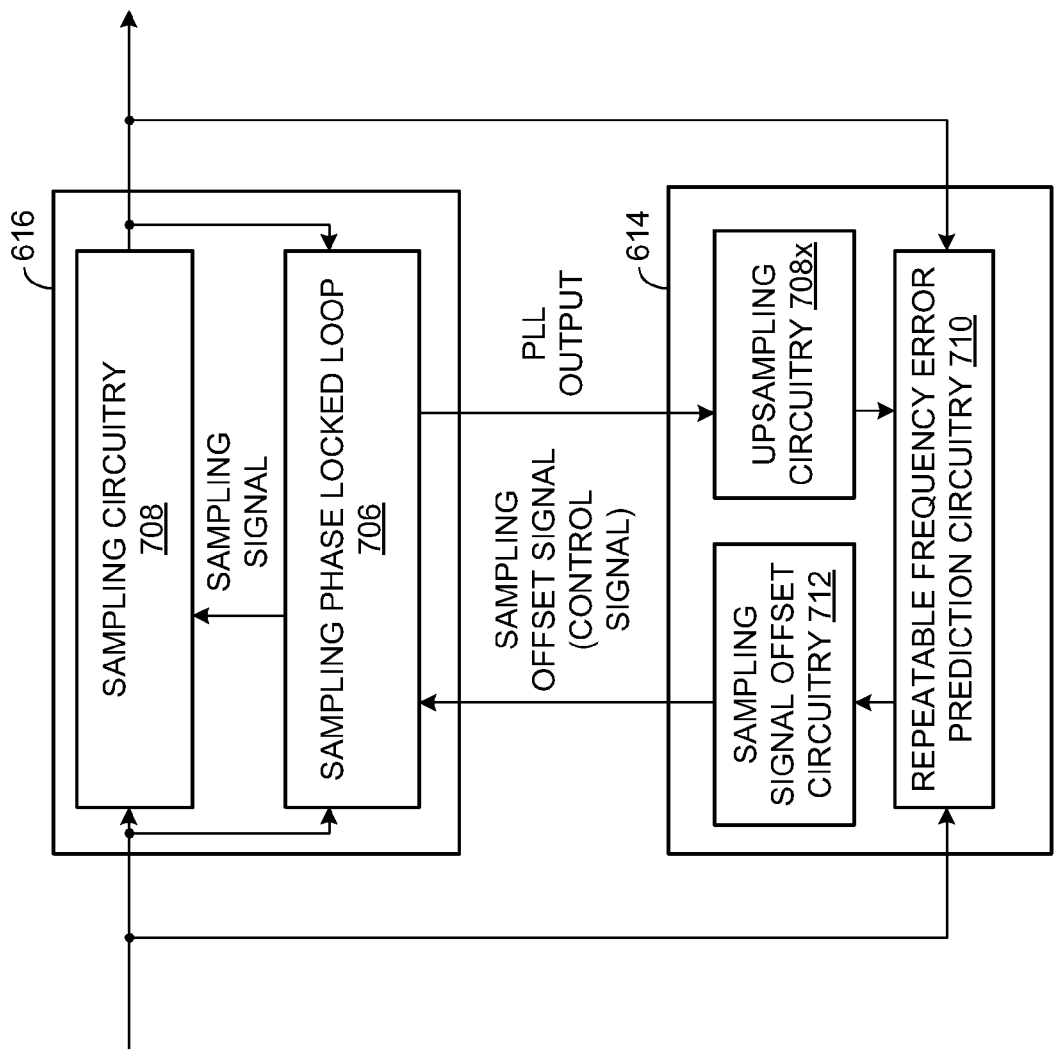
FIG. 7 is a block diagram illustrating an Analog to Digital Converter (ADC) and a Disk Lock Clock (DLC) system according to one or more embodiments of the present invention.

FIG. 7 is a block diagram illustrating an ADC and a DLC system according to one or more embodiments of the present invention. The ADC 616 and the DLC system 614 of FIG. 7 were previously described with reference to FIGS. 4 and 5 will be described in more detail with reference to FIG. 7. With the embodiment of FIG. 7, the ADC 616 includes sampling circuitry 708 and a sampling Phase Locked Loop (PLL) 706. The sampling PLL 706 receives a sampling offset signal (control signal) from the DLC system 614 and input from one or more of an input to the sampling circuitry and an output of the sampling circuitry 708. Based upon these signals the sampling PLL 706 generates the sampling signal to the sampling circuitry 708. The sampling circuitry 708 may be any type of sampling circuitry having sufficient sampling rate and capacity to adequately sample the input analog signal to produce the output digital signal. As was previously described, a bandwidth of the sampling PLL 706 is sufficient to meet the frequency characteristics of the incoming analog signal. However, with the embodiment of FIG. 7 the bandwidth of the sampling PLL 706 may be insufficient to track frequency errors caused by "centering error" as was previously described.

Thus, according to the embodiment of FIG. 7, the DLC system 614 includes upsampling circuitry 708x that receives and upsamples the output of the sampling PLL 706 and produces an upsampled signal to repeatable frequency error prediction circuitry 710 of the DLC system 614. With the embodiment of the DLC system 614 of FIG. 7, the repeatable frequency error prediction circuitry 710 effectively samples its input signal at a much higher sampling frequency than the servo wedge rate, e.g., sampling at approximately 1 MHz as compared to the servo wedge rate of 10 KHz. By sampling the input analog signal at a much higher sampling rate, the servo wedge error between adjacent servo wedges may be relatively easily tracked and resultantly used to produce frequency offset(s) used to compensate for the "centering error". Such is the case because the frequency variation of the servo wedge error caused by the "centering error" now falls within the bandwidth of the sampled signal at the higher sampling frequency. Once the periodic frequency error caused by the "centering error" is determined by the repeatable frequency error prediction circuitry 710, it produces an output to sampling signal offset circuitry 712. The sampling signal offset circuitry 712 then produces the sampling offset signal (control signal) to the sampling PLL 706 (or alternately to the sampling circuitry 708), which is used to produce the sampling signal to the sampling circuitry 708. By the DLC system 614 predicting frequency offset error caused by the "centering error", a frequency offset signal is used to adjust sampling of an ADC in the read path, effectively compensate for the frequency offset error caused by the "centering error."

Figure 8:
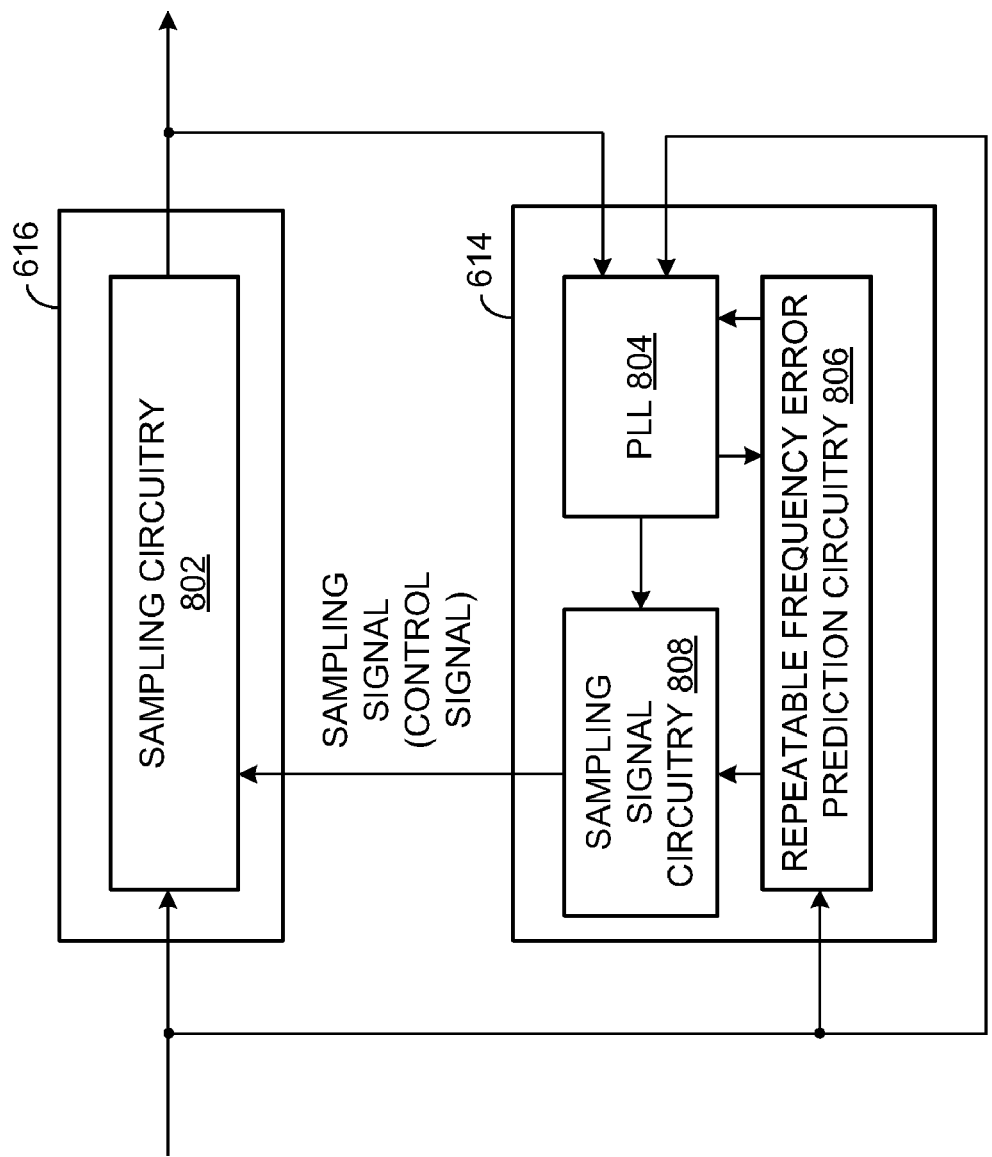
FIG. 8 is a block diagram illustrating an ADC and a DLC system according to one or more embodiments of the present invention.

FIG. 8 is a block diagram illustrating an ADC and a DLC system according to one or more embodiments of the present invention. As contrasted to the structure of FIG. 7, the ADC 616 includes only sampling circuitry 802 and receives a sampling signal (control signal) from the DLC system 614. The DLC system 614 includes a PLL 804 that has a bandwidth (sampling rate) that is great enough to track the periodic frequency offset error caused by the "centering error." The PLL 804 produces an output to repeatable frequency error prediction circuitry 806. The repeatable frequency error prediction circuitry 806 produces an output to sampling signal circuitry 808, which produces the sampling signal (control signal) to the sampling circuitry 802 of the ADC 616.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus, comprising:
   an analog to digital converter (ADC) for sampling an analog signal based upon a control signal to produce a digital signal, wherein the analog signal corresponding to data read from a storage media of a hard disk drive (HDD); and
   a disk lock clock (DLC) system, for producing the control signal based on the analog signal and the digital signal, wherein the control signal includes compensation for at least one periodic frequency offset error within the analog signal that is associated with the storage media.

2. The apparatus of claim 1, wherein the DLC system further comprising:
   a repeatable frequency error prediction circuitry for determining the at least one periodic frequency offset error within the analog signal that is associated with the storage media.

3. The apparatus of claim 1, wherein the DLC system further comprising:
   a repeatable frequency error prediction circuitry for determining the at least one periodic frequency offset error within the analog signal that is associated with the storage media; and
   a sampling offset circuitry for generating the control signal based upon the at least one periodic frequency offset error determined by the repeatable frequency error prediction circuitry.

4. The apparatus of claim 1, wherein the DLC system further comprising:
   a repeatable frequency error prediction circuitry for sampling the analog signal at a frequency that is greater than a servo wedge rate within the analog signal in accordance with determining the at least one periodic frequency offset error within the analog signal that is associated with the storage media.

5. The apparatus of claim 1, wherein:
   the DLC system is coupled for receiving the analog signal and the digital signal provided and for providing the control signal to the ADC.

6. The apparatus of claim 1, wherein:
   the at least one periodic frequency offset error corresponding to at least one of a track location, a centering error, and a disk slip associated with the storage media of the HDD.

7. The apparatus of claim 1, further comprising:
   a read head for reading the data from the storage media of the HDD; and wherein:
   the at least one periodic frequency offset error corresponding to the read head passing over the storage media of the HDD.

8. The apparatus of claim 1, wherein:
   the control signal is a sampling offset signal.

9. The apparatus of claim 1, wherein:
   the DLC system is implemented in hardware.

10. The apparatus of claim 1, wherein:
    the DLC system is implemented in firmware.

11. The apparatus of claim 1, wherein:
    the HDD is implemented within a handheld audio unit, a computer, a wireless communication device, or a personal digital assistant.

12. An apparatus, comprising:
    a read head for reading data from storage media of a hard disk drive (HDD);
    an analog to digital converter (ADC) for sampling an analog signal based upon a control signal to produce a digital signal, wherein the analog signal corresponding to the data read from the storage media of the HDD; and
    a disk lock clock (DLC) system, for producing the control signal based on the analog signal and the digital signal, wherein the control signal includes compensation for at least one periodic frequency offset error within the analog signal that is associated with the storage media; and
    wherein:
    the at least one periodic frequency offset error corresponding to at least one of a track location, a centering error, and a disk slip associated with the storage media of the HDD; and
    the DLC system is coupled for receiving the analog signal provided to the ADC and the digital signal provided from the ADC and for providing the control signal to the ADC.

13. The apparatus of claim 12, wherein the DLC system further comprising:
    a repeatable frequency error prediction circuitry for determining the at least one periodic frequency offset error within the analog signal that is associated with the storage media.

14. The apparatus of claim 12, wherein the DLC system further comprising:
    a repeatable frequency error prediction circuitry for determining the at least one periodic frequency offset error within the analog signal that is associated with the storage media; and
    a sampling offset circuitry for generating the control signal based upon the at least one periodic frequency offset error determined by the repeatable frequency error prediction circuitry.

15. The apparatus of claim 12, wherein the DLC system further comprising:
    a repeatable frequency error prediction circuitry for sampling the analog signal at a frequency that is greater than a servo wedge rate within the analog signal in accordance with determining the at least one periodic frequency offset error within the analog signal that is associated with the storage media.

16. A method, comprising:
    operating an analog to digital converter (ADC) for sampling an analog signal based upon a control signal to produce a digital signal, wherein the analog signal corresponding to data read from a storage media of a hard disk drive (HDD); and
    producing the control signal based on the analog signal and the digital signal, wherein the control signal includes compensation for at least one periodic frequency offset error within the analog signal that is associated with the storage media.

17. The method of claim 16, further comprising:
    determining the at least one periodic frequency offset error within the analog signal that is associated with the storage media; and
    generating the control signal based upon the determined at least one periodic frequency offset error.

18. The method of claim 16, further comprising:
    employing a read head for reading the data from the storage media of the HDD; and wherein:
    the at least one periodic frequency offset error corresponding to the read head passing over the storage media of the HDD.

19. The method of claim 16, wherein:
    the control signal is a sampling offset signal.

20. The method of claim 16, wherein:
    the HDD is implemented within a handheld audio unit, a computer, a wireless communication device, or a personal digital assistant.

* * * * *